United States Patent [19]
Bassenyemukasa et al.

[11] Patent Number: 5,623,539
[45] Date of Patent: Apr. 22, 1997

[54] USING VOICE SIGNAL ANALYSIS TO IDENTIFY AUTHORIZED USERS OF A TELEPHONE SYSTEM

[75] Inventors: Charles S. Bassenyemukasa, Tinton Falls; Randolph J. Pilc, Toms River, both of N.J.

[73] Assignee: Lucent Technologies Inc., Murray Hill, N.J.

[21] Appl. No.: 189,003

[22] Filed: Jan. 27, 1994

[51] Int. Cl.$^6$ .................................................. H04M 1/66
[52] U.S. Cl. .......................... 379/88; 379/112; 379/189; 395/2.55; 395/2.79; 395/2.82
[58] Field of Search .................................. 379/67, 88, 89, 379/112, 189, 281, 188, 196, 197, 198; 381/41, 42, 43; 395/2.55, 2.56, 2.57, 2.82, 2.84, 2.79

[56] References Cited

U.S. PATENT DOCUMENTS

| | | | |
|---|---|---|---|
| 3,896,266 | 7/1975 | Waterbury | 379/144 |
| 4,032,711 | 6/1977 | Sombur | 381/42 |
| 4,363,102 | 12/1982 | Holmgren et al. | 381/42 |
| 4,720,863 | 1/1988 | Li et al. | 381/42 |
| 4,773,093 | 9/1988 | Higgins et al. | 381/42 |
| 4,827,518 | 5/1989 | Feustel et al. | 381/42 |
| 4,961,229 | 10/1990 | Takahashi | 381/42 |
| 5,036,539 | 7/1991 | Wrench, Jr. et al. | 381/43 |
| 5,054,083 | 10/1991 | Naik et al. | 381/42 |
| 5,123,048 | 6/1992 | Miyamae et al. | 381/41 |
| 5,166,971 | 11/1992 | Vollert | 379/88 |
| 5,247,497 | 9/1993 | Cohn | 379/89 |
| 5,271,089 | 12/1993 | Bohler | 395/2 |
| 5,274,695 | 12/1993 | Green | 379/88 |
| 5,339,385 | 8/1994 | Higgins | 395/2.55 |
| 5,414,755 | 5/1995 | Bahler et al. | 379/67 |

FOREIGN PATENT DOCUMENTS

0238156  10/1986  Japan ..................... 379/201

OTHER PUBLICATIONS

"Methods and Experiments For Text–Independent Speaker Recognition Over Telephone Channels", H. Gish et al., ICASSP 86 Tokyo, 1986 IEEE, pp. 865–868.

"Recent Advances in Automatic Speaker Recognition", A.E. Rosenberg et al. Advances in Speech Signal Processing, 1992 pp. 701–738.

"An Unsupervised, Sequential Learning Algorithm for the Sequentation of Speech Waveforms with Multiple Speakers," Siu et al., IEEE '92 pp. 189–192.

"Text Independent Speaker Identification using Automatic Acoustic Segmentation" Rose et al., 1990 IEEE pp. 293–296.

"Speaker Verification using Discrete Parameter Hidden Maskov Models" IBM Technical Disclosure Bulletin, Aug. 1994 vol. 37, No. 08.

Primary Examiner—Thomas W. Brown
Assistant Examiner—Scott L. Weaver

[57] ABSTRACT

A user transparent telephone fraud detection and prevention system employs speech analysis techniques to determine whether at least one participant in a telephone conversation is an authorized user of the telephone line. A multi-party conversation on a phone line (e.g., a PBX line) is analyzed to separate speech information from noise and then the speech information is separated according to each participant in the conversation. Speech data for each participant is then compared to a library of speech data of authorized users of the system. If a match is found the system determines that the call is authorized. If no match is found the call is determined to be unauthorized and appropriate line control functions are carried out. Examples of the line control functions are: terminating the call; recording the call; disabling the line; intruding into the call and playing noise or a warning message; and intruding into the call to demand identification data from the call participants. The system is also used to verify that a user of a calling card number is an authorized user.

25 Claims, 7 Drawing Sheets

FIG. 6

| COMMAND PRIMITIVE | PARAMETERS | SWITCH SEMANTICS |
|---|---|---|
| NULL | | NOTHING IS DONE (DEFAULT FOR AUTHORIZED CALLS) |
| TERMINATE CALL | LINE ID, START-TIME | TERMINATES THE CALL ON THE LINE AT THE SPECIFIED TIME |
| RECORD CALL | LINE ID, START-TIME, DURATION | COPIES THE VOICE SIGNAL ON THE LINE TO A SWITCH PORT THAT IS PRECONFIGURED TO SUPPORT A RECORDING DEVICE |
| INTRUDE WITH NOISE | LINE ID, START-TIME, DURATION, NOISE FILE DESCRIPTOR | INTRUDES INTO THE CALL BY SUPERIMPOSING A SPECIFIED NOISE SIGNAL OVER THE CONVERSATION, FOR THE GIVEN DURATION, STARTING AT THE SPECIFIED TIME |
| INTRUDE WITH INFORMATIONAL SOUND | LINE ID, START-TIME, DURATION, INFORMATION FILE DESCRIPTOR | INTRUDES INTO THE CALL BY SUPERIMPOSING A SPECIFIED WARNING OR OTHER INTELLIGIBLE VOICE SOUND OVER THE CONVERSATION, FOR THE GIVEN DURATION, STARTING AT THE SPECIFIED TIME |
| LOG SPECIAL | LINE ID, COMPLETION-CODE | ON TERMINATION, THE CURRENT CALL IS LOGGED WITH THE SPECIFIED COMPLETION CODE |
| SPEAKER VERIFY | LINE ID | INVOKES A SPEAKER VERIFICATION THAT CAN INTRUDE IN THE CALL AND QUERY FOR IDENTITY CLAIMS, IF THERE IS ONE INTERFACED WITH THE SWITCH |
| LOCK LINE | LINE ID, START-TIME, DURATION | DISABLES THE LINE FOR A GIVEN DURATION, STARTING AT THE SPECIFIED TIME |
| GENERATE LINE EXCEPTION | LINE ID, FAULT-TYPE | GENERATE FAULT OF THE SPECIFIED TYPE ON THE SPECIFIED LINE AND MAY CAUSE A MAINTENANCE ALARM |

USING VOICE SIGNAL ANALYSIS TO IDENTIFY AUTHORIZED USERS OF A TELEPHONE SYSTEM

TECHNICAL FIELD OF THE INVENTION

This invention relates to a telephone toll-fraud control system that uses voice analysis algorithms and, more specifically, to a system that can monitor a telephone line, use voice signal analysis algorithms to detect unauthorized use of the line, and initiate appropriate line control actions.

BACKGROUND OF THE INVENTION

Telephone toll-fraud, particularly fraud initiated via security violations of customer premises equipment, has become a significant expense to corporations throughout the world. For example, private branch exchange ("PBX") switches are often a target for thieves who steal telephone services because a PBX usually supports a "direct inward system access" (DISA) feature. In such a system, authorized personnel can call into the PBX, log in using an access code, and execute various PBX functions, including dialing long-distance calls. Thieves usually obtain a PBX's DISA dial number and access code through direct theft, misrepresentation, or using computer techniques.

Another common fraud activity is the unauthorized use of telephone calling cards. Thieves can illegally obtain a user's calling card number in a variety of ways, including, e.g., watching a user making a call and noting the numbers dialed. Thereafter, the thief can make long distance calls using the stolen number. It can take days or even weeks to detect such fraudulent use of a card, during which time a considerable number of illegal calls can be made.

Recent advances in voice signal processing and automatic speaker recognition systems have been used to address telephone fraud. "Voice" is defined herein as any audible utterance by a human. Typical automatic speaker recognition systems operate in one of two modes, referred to as "verification mode" and "identification mode" in A. E. Rosenberg and F. K. Soong, "Recent Advances in Automatic Speaker Recognition", Advances in Speech Signal Processing, pp. 701–738 (Marcel Dekker, Inc., 1992) (incorporated herein by reference).

In the "verification mode" of an automatic speaker recognition system, an identity claim is presented to the system along with a voice sample from an unknown speaker. A speaker verification decision results from comparing the voice sample with a stored voice model for the speaker whose identity is claimed and determining whether the difference is within a given threshold value. If the difference is within the threshold, then the identity claim is confirmed and the speaker may be given access to a restricted telephone network.

For a speaker recognition system operating in the "identification mode" a voice sample from an unknown speaker is compared with voice models of a population of known speakers. A speaker identification decision indicates whether the voice sample matches one of the models of known speakers to within a given threshold value.

Systems for detecting and controlling telephone toll-fraud can be classified into three categories: aggressive, reactive, and passive. Aggressive systems are designed to control access to the telephone line by requiring the prospective user to present some identity claim information, such as a password, to be used for authentication before the user is granted access to the system. Such a system prompts the user to utter a spoken "password" compares it to authorized voice profiles, and grants or refuses access accordingly. This is a "text-dependent" system since it analyzes a specific word (i.e., text). Examples of such systems are "VoiceLock" from Moscom of Pittsford, N.Y. and "VVF" from Wye of Annapolis, Md. Less advanced aggressive systems use touch-tone entered passwords.

Reactive systems monitor protected telephone lines or switch use and keep a count of specified events such as the number of off-hour calls, international calls, very short calls, or very long calls. The goal is to issue warnings or alarms when appropriate threshold values are exceeded. Companies selling such reactive systems include Western Telematic of Irvine, California, XTEND of New York, N.Y., and Infotext of Schaumburg, Ill.

Finally, passive systems are those which discover toll-fraud through postmortem analysis of call accounting records.

SUMMARY OF THE INVENTION

The present invention is a system and method for detecting and preventing telephone related fraud employing, in preferred embodiments, user transparent voice analysis techniques to determine whether at least one speaker on a telephone line is an authorized user of the telephone line. In one embodiment, voice input from a live conversation is segmented to separate segments of voice information from nonvoice information (e.g., noise). The separated voice information is then segregated into one or more voice profiles, each voice profile corresponding to one participant in the conversation. The voice profiles are then compared to stored voice profiles of authorized users of the telephone line to determine if one of the conversation participants is an authorized user.

In one embodiment, an apparatus for carrying out the invention comprises: a voice segregator for receiving voice information from the telephone line and segregating the received voice information into a plurality of voice patterns, each voice pattern corresponding to one of a plurality of users of the telephone line; a memory for storing voice information for each of a plurality of authorized users of the telephone line; and a comparator for receiving the voice patterns from the voice segregator and comparing each voice pattern to the voice information stored in the memory to determine whether one of the users of the telephone line is an authorized user. The preferred apparatus can be used to protect a number of telephone lines, such as the lines in a private branch exchange.

The voice information received by the voice segregator can correspond to a live conversation with a plurality (i.e., two or more) participants. The system may also include a line interrupt device for interrupting a call on the telephone line if the comparator determines that none of the users of the telephone line is an authorized user. Alternatively (or additionally), the system can include a recording device for recording the voice information received from the telephone line if the comparator determines that none of the users of the telephone line is an authorized user.

If no authorized user is found to be using the telephone line, the apparatus can play a warning message on the telephone line or can generate noise. The telephone line can also be disabled, either permanently or for a predetermined period of time.

The comparator can identify which of the voice patterns found on the telephone line most closely matches any of the stored authorized user voice patterns. quantitative difference is calculated between the identified voice pattern from the telephone line and the authorized voice pattern that results in the closest match, and then the quantitative value is compared to a threshold to thereby determine whether the telephone line is being used by an authorized user.

The telephone call to which the transparent fraud detection technique is applied can be one that was originated using an access code, such as a telephone calling card number. The system checks the validity of the code in a standard manner (e.g., by comparing the code to a library of known valid codes) and completes a desired call only if the access code is valid. Thereafter, the conversation on the line is analyzed to determine if one of the conversation participants is an authorized user of the access code.

In another aspect, the invention features a method for determining whether a telephone line is being used by an authorized user, the method comprising the steps of: segregating live voice information received from the telephone line into a plurality of voice patterns, each pattern corresponding to a single user of the telephone line; comparing each live voice pattern to each of a plurality of stored authorized user voice patterns; and determining whether the telephone line is being used by an authorized user based on the results of the comparing step. Before the segregating step, the method may also include the step of separating live voice information on the telephone line from nonvoice information.

In yet another aspect, the invention features an apparatus for determining whether a user of a telephone system is an authorized user of an access code associated with the telephone system, the apparatus including: means for receiving a desired destination telephone number and an access code from a user telephone; means for determining whether the received access code is a valid access code; means for connecting the user telephone to a telephone corresponding to the destination telephone number over a telephone line if the access code is valid, a voice segregator for receiving voice information from the telephone line and segregating the voice information into one or more voice profiles, each profile corresponding to a participant in the conversation, a memory for storing a voice profile for at least one authorized user of the access code; and a comparator for comparing the segregated voice profiles to the stored voice profiles of the authorized users to determine whether one of the participants in the conversation is an authorized user of the access code.

The present invention provides a significant improvement over prior art systems since telephone lines may be tested for fraudulent use without active cooperation by the participants in the conversation. In fact, the participants in the conversation need not even know that the technique of the invention is being carried out, i.e., the system is transparent to the user. Such a system and method enables protected telephone systems to be effectively monitored for fraud without wasting the time of those individuals authorized to use the system.

A further significant advantage of the invention is that the users of the protected telephone system need not become familiar with the operation of the invention's fraud prevention system. In other words, since the fraud prevention feature operates transparently to the users, the users need not adjust their usual method for making calls on their phone lines. The users need not learn special passwords or access codes, etc., but may simply continue to make calls as they would if their phone system had no fraud prevention characteristic.

Yet another advantage is that the system does not need to recognize spoken words. Instead, the syntactic characteristics of the voice profiles are compared, without the need to identify certain words, as in a password type system. Thus, the present "text-independent" system is simpler to implement and will even work for speakers of different languages.

Other advantages of the present invention will become apparent from the following detailed description of illustrative embodiments of the invention.

BRIEF DESCRIPTION OF THE DRAWINGS

FIG. 6 is a chart of telephone line control command primitives that may be used with one embodiment of the invention.

DETAILED DESCRIPTION

Figure 1:
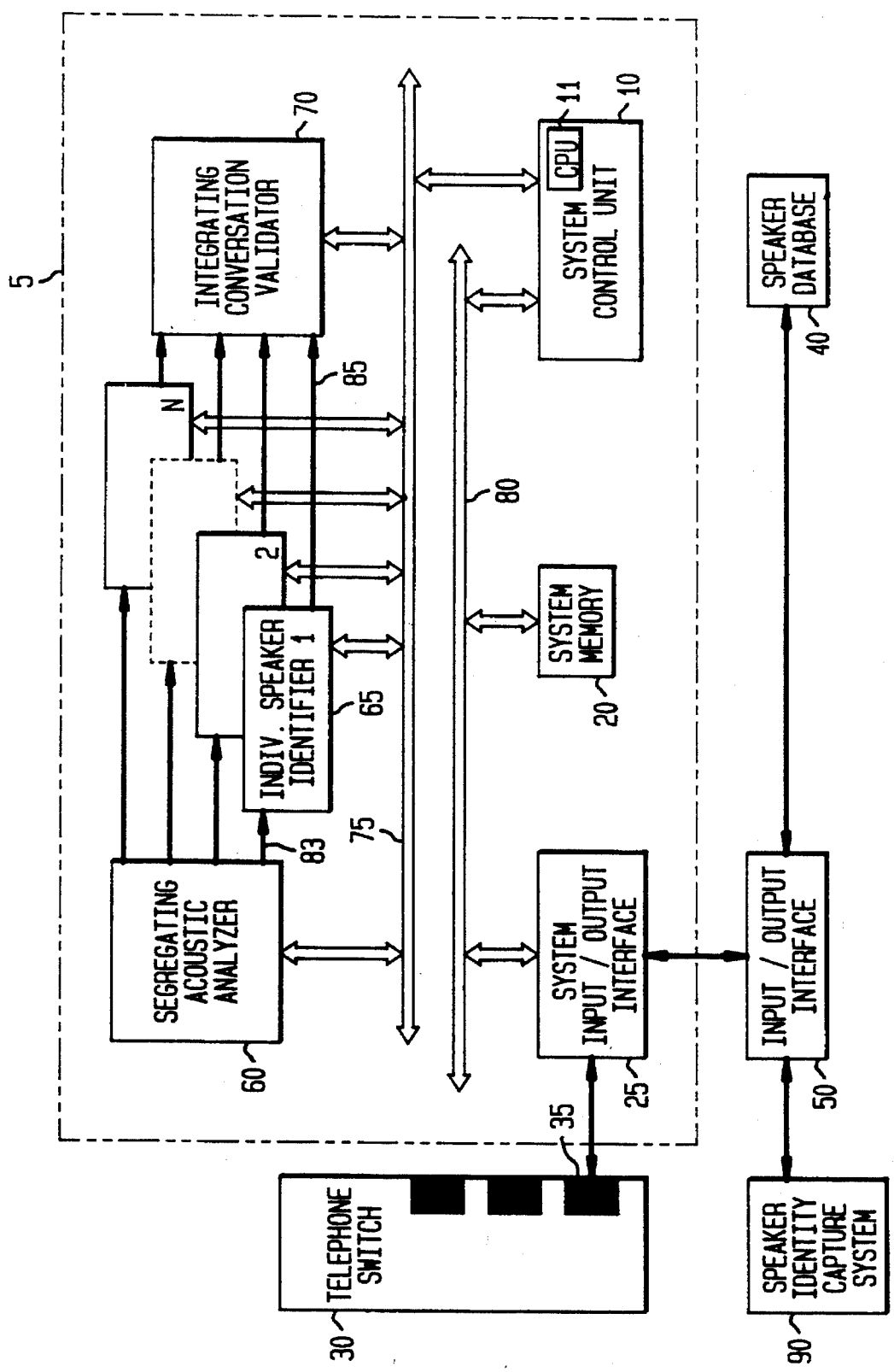
FIG. 1 is a block diagram of a fraud prevention system according to one embodiment of the invention.

FIG. 1 is a block diagram showing the architecture of a voice identifying telephone security ("VITES") system according to one embodiment of the present invention. One VITES module 5 is shown and several such modules may be included in the system, as explained more fully below. Each VITES module 5 comprises a system control unit 10, system memory 20 and system input/output ("I/O") interface 25, each of which is connected to a data bus 80. Module 5 also includes a data bus 75, a segregating acoustic analyzer ("SAA") 60, a plurality of individual speaker identifiers ("ISI") 65 and an integrating conversation validator ("ICV") 70.

A telephone switch 30 includes a single line port 35 connected to system I/O interface 25. A speaker identity capture system 90 is connected to system I/O interface 25 through an I/O interface 50. I/O interface 50 also connects a speaker database 40 to system I/O interface 25.

Telephone switch 30 will preferably be a private branch exchange (PBX) system for customer premises use. Speaker database 40 contains the voice profiles of all the speakers that are authorized to use the protected lines on the PBX and other parametric information that may be used by different digital signal processing ("DSP") logic components in the system.

The voice profiles in speaker database 40 are input through the speaker identity capture system 90. The speaker identity capture system 90 is any well known system that will accept voice samples from authorized users of the system and create voice profiles for storage in speaker database 40.

The system of FIG. 1 employs a distributed parallel computing paradigm with digital speech signal processing distributed among its several elements and coordinated by system control unit 10.

System control unit 10 includes a central processing unit (CPU) 11 that executes a supervisory operating system to coordinate the interactions between the different system elements. CPU 11 also executes application software that reads the decision on the presence of an authorized speaker in a monitored conversation and issues appropriate commands to the telephone switch to control the relevant telephone line, as is explained below.

Memory 20 may be a combination of random access memory (RAM), read only memory (ROM), and/or erasable programmable read only memory (EPROM) components. One or more system components may directly access memory 20, without arbitration by system control unit 10. In addition, one or more of the system components may incorporate its own local memory and/or buses.

The SAA 60, ISI 65, and ICV 70 devices may be built using any combination of general-purpose DSP platforms, customized DSP platforms (cDSP) and/or application specific integrated circuit (ASIC) devices. The DSP3 from AT&T, described in J. H. Snyder, et al., "Tools For Real-Time Signal Processing Research", IEEE Communications Magazine, November 1993, pp. 64–74 (incorporated herein by reference) is an example of a DSP platform that is suitable for this kind of system.

Each VITES module 5 protects a single line port 35, and database 40 can be shared by a number of VITES modules. Conventional storage peripherals, such as SCSI or EDI hard drives, may be used for database 40. However, higher speed high density non-volatile memory devices such as the emerging multi-megabyte flash memories will be more suitable, since high speed access is preferred.

The system may draw its power from a local battery or from another source, such as a PBX interface. Similarly, the system may use its own clock for timing, or may rely on a clock from another source.

Figure 2:
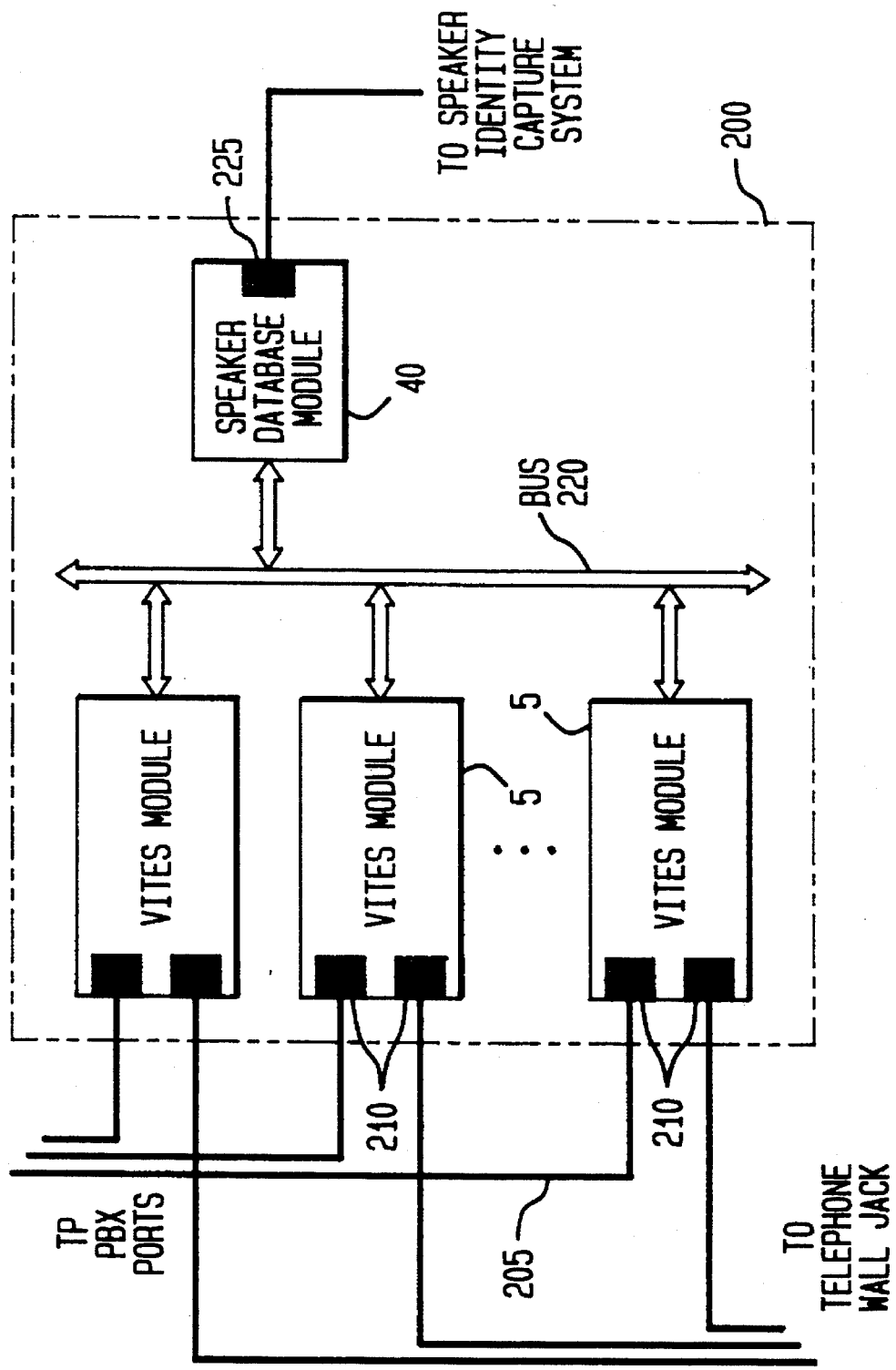
FIG. 2 is a block diagram of a first implementation of the system shown in FIG. 1.
Figure 3:
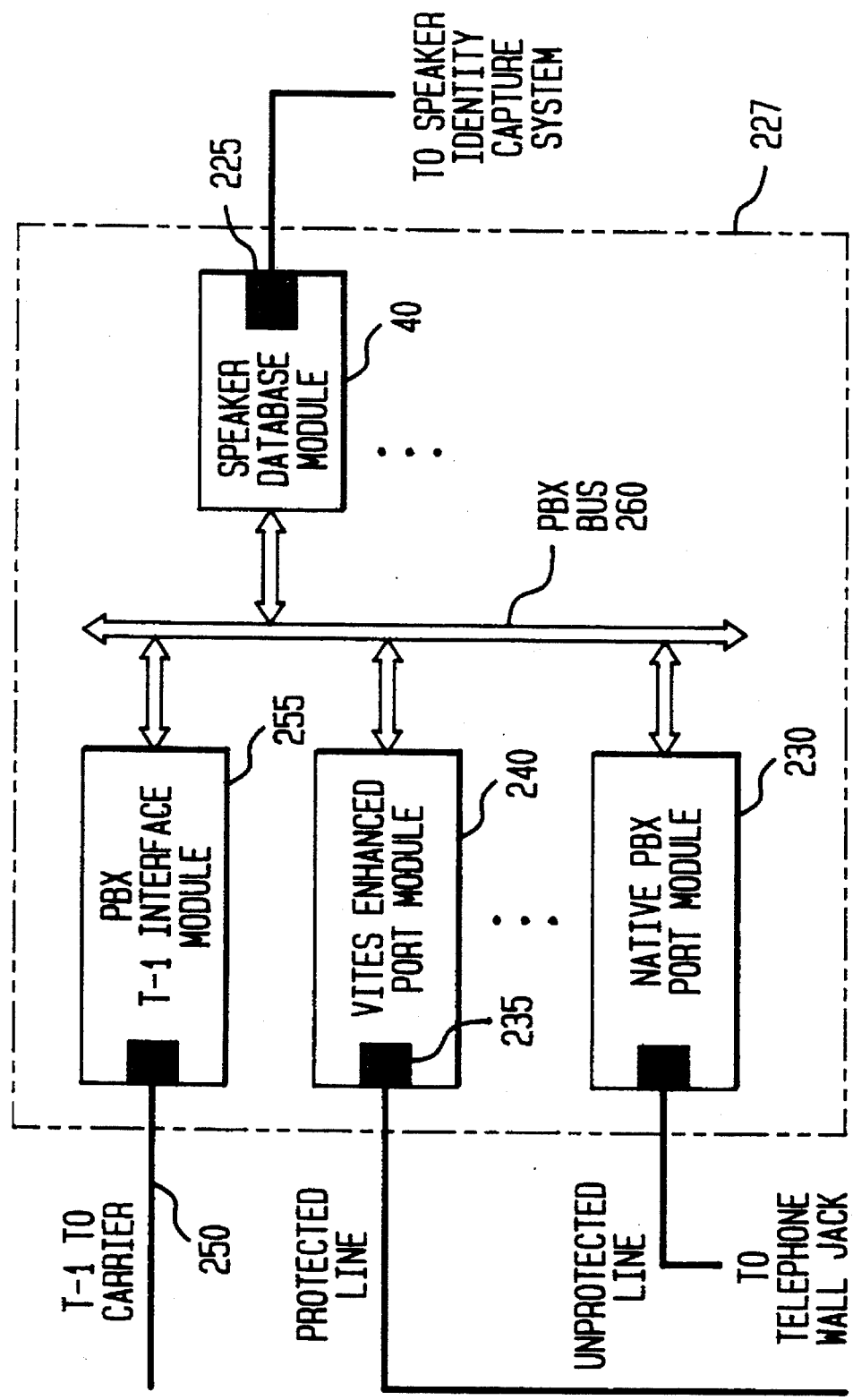
FIG. 3 is a block diagram of a second, alternative implementation of the system shown in FIG. 1.

FIGS. 2 and 3 show two alternate embodiments of an overall system architecture implementing the fraud control system shown in FIG. 1. In the approach shown in FIG. 2, the system is implemented, as a stand-alone external adjunct 200 to the PBX (not shown). Each "protected" line 205 from a PBX detours through a VITES module 5 by way of two communications ports 210. The speaker database 40 is shared by all VITES modules across a bus structure 220 and also has a communications port 225 for access by the speaker identity capture system 90 (see FIG. 1).

In FIG. 3, the approach is to fully integrate the VITES technology into a PBX 227 by replacing certain standard PBX port modules 230 with a VITES enhanced module 240. Each VITES enhanced module 240 accepts a line from a telephone set via a serial port 235 which is then mapped (using static or dynamic techniques) to a channel on a T-1 trunk 250 that terminates on a PBX T-1 interface module 255. A bus structure 260 is used to support this mapping and to allow multiple VITES modules 5 to share a single speaker database 40. The speaker database 40 has a communications port 225 for access by the speaker identity capture system 90 (see FIG. 1). Other standard PBX components are included in the system 227, although not illustrated in FIG. 3.

Figure 4:
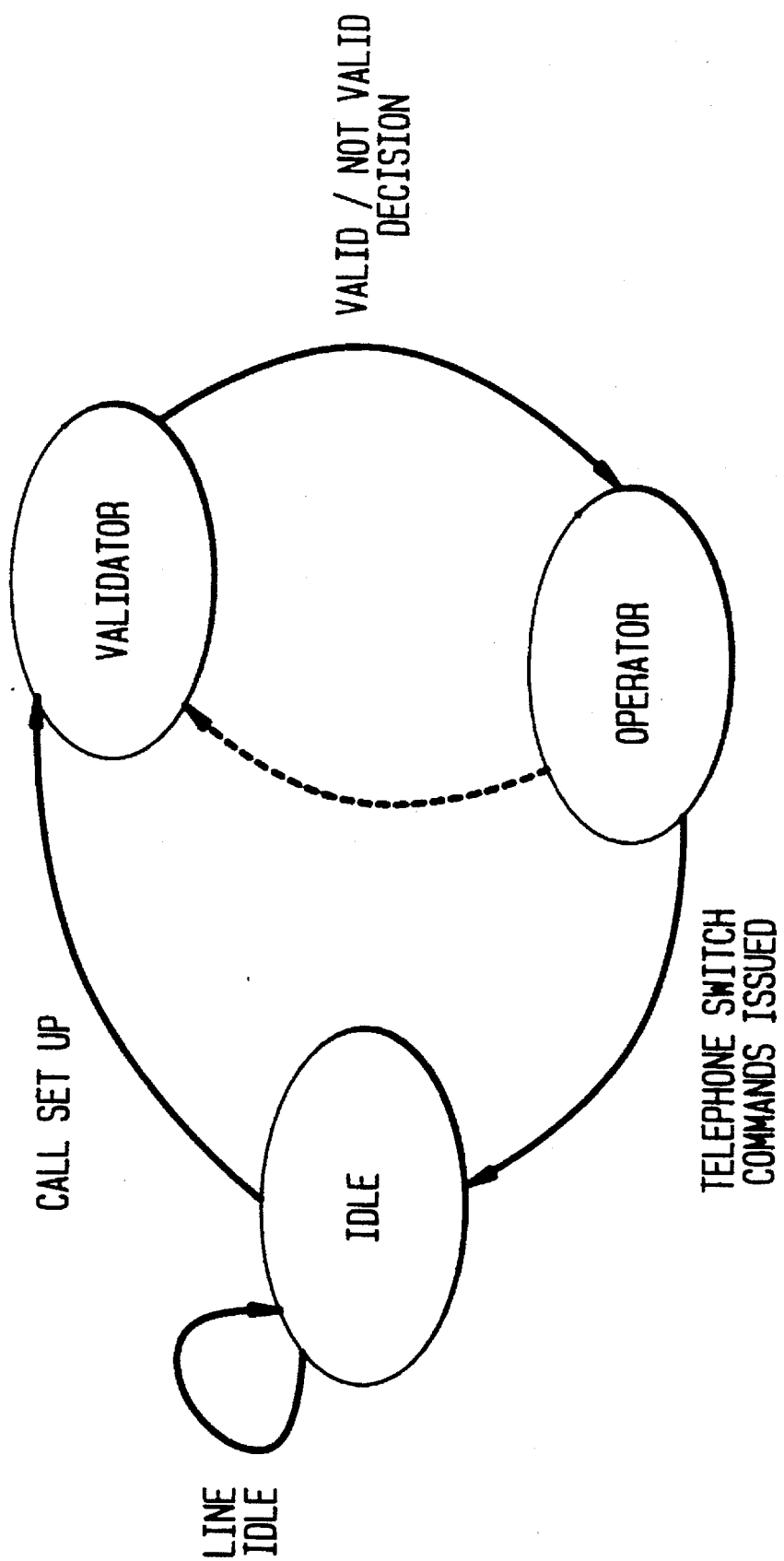
FIG. 4 is a state diagram illustrating the three possible states of the system shown in FIG. 1.

FIG. 4 is a state diagram showing the various states of the VITES system. In the IDLE state the system monitors a protected telephone line checking for use of that line. As soon as a call is established on the line the system transitions into the VALIDATOR state, where it invokes the procedure for monitoring the conversation and determining if the call is authorized. If the call terminates, or once the above procedure yields a "valid" or "not valid" result, the system goes into the OPERATOR state where it generates line control commands and transmits them to the telephone switch carrying the line.

It may be necessary for the system to revisit the VALIDATOR state depending on state variables in the OPERATOR state. For example, a decision that there is no authorized user may be double checked by returning to the VALIDATOR state and performing the analysis a second time. This may happen if the system has a high level of noise that could have interfered with the analysis or if the first analysis almost produced a match. If the system does not decide to return to the VALIDATOR state, the system will exit the OPERATOR state and go back to the IDLE state when the call terminates.

Figure 5:
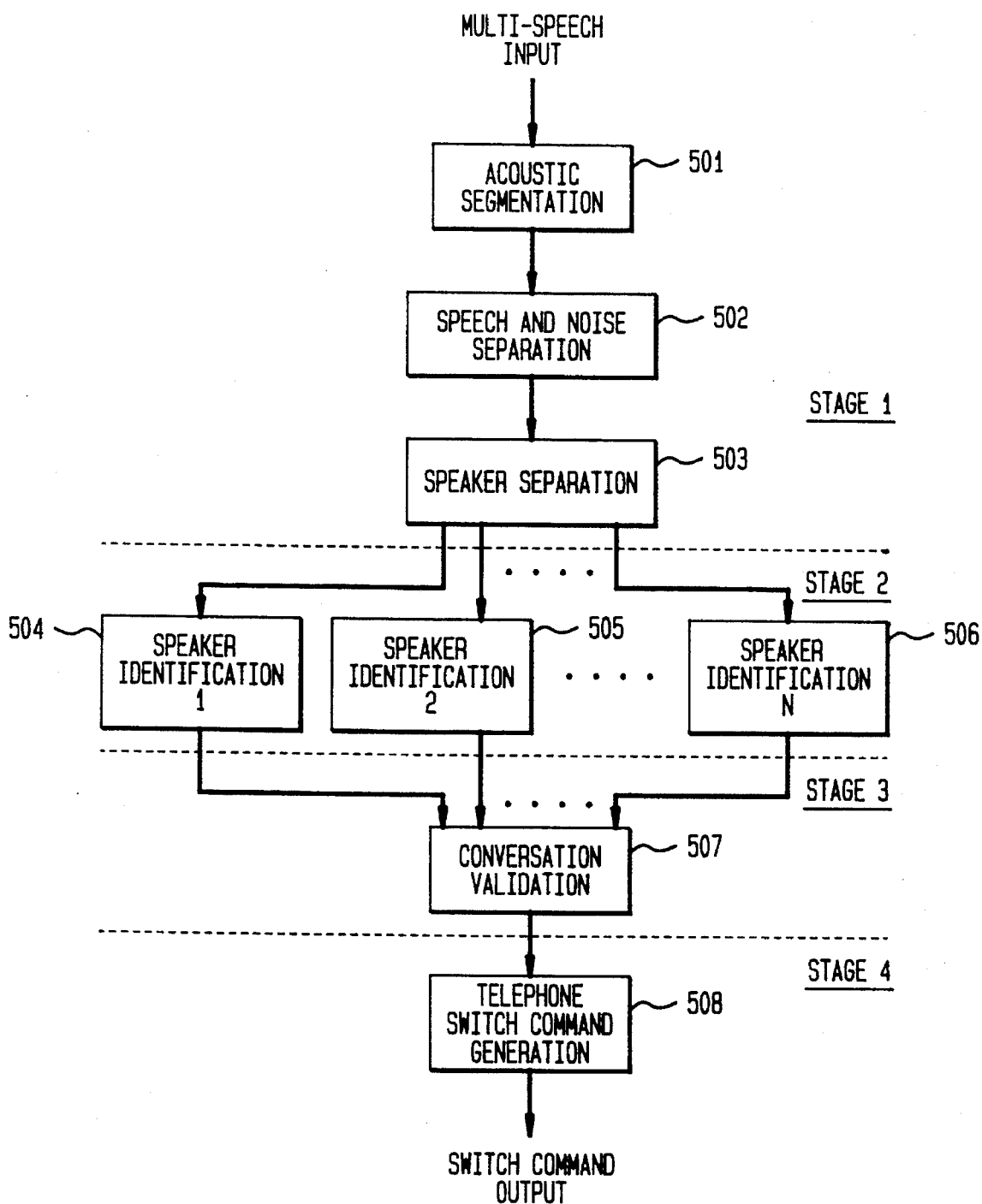
FIG. 5 is a flow diagram illustrating the steps used to carry out the fraud prevention method of the system shown in FIG. 1.

FIG. 5 is a flow diagram that illustrates the procedure that is executed in a VITES module when monitoring a live conversation on a telephone line to determine if one or more of the speakers has a voice that is authorized to use the protected telephone line. The procedure is executed in four major stages.

In the first stage, voice traffic on a line is received and subjected to acoustic segmentation by SAA 60 such that each speaker's voice is isolated and can be analyzed or transmitted separately. One algorithm that can be used to segment the voices is described in M. Siu, G. Yu, and H. Gish, "An Unsupervised Sequential Learning Algorithm For The Segmentation Of Speech Waveforms With Multiple Speakers", Proc. IEEE Int. Conf. on Acoustics, Speech, and Signal Processing, 1992, Vol. II, pp. 189–192 (incorporated herein by reference), and has three main components. The first component, "acoustic segmentation" (step 501 in FIG. 5), generates contiguous segments of voice frames such that each segment can, with a high probability, be tagged as either "voice" or ambient "noise". The "voice" segments are separated from the "noise" segments by the second step of the algorithm (step 502). In the third step, speaker separation (step 503), the system combines, for each speaker, all voice segments that belong to that speaker and transmits them separate from the rest of the mixed-voice information. The output of SAA 60 consists of a series of single-speaker voice traffic streams identified as 83 in FIG. 1.

In the second stage of the flow chart shown in FIG. 5, each of the parallel streams of voice traffic 83 (see FIG. 1) coming from SAA 60 is analyzed for text-independent speaker identification by ISI 65. A first speaker is identified (step 504), a second speaker is identified (step 505), etc. up to N speakers (step 506). A technique that produces probabilistic output for speaker identification may be used in this stage. For example, an output value of Pi may be generated, which is the probability that unknown speaker i matches one of the voice profiles in the speaker database 40 of persons authorized to use the protected line. The more effective current techniques for such analysis can be classified into three groups that are all briefly described in the article, cited above, by Rosenberg et al. The three groups are vector quantization, matrix and segment quantization, and hidden Markov modeling (HMM).

In FIG. 1, each single-speaker voice stream 83 is analyzed by a separate ISI 65, in parallel with the other streams from the multi-speaker conversation. The parallelism may be implemented in hardware, requiring several ISI DSPs, or in software, making it possible to use one powerful ISI DSP.

The third stage of FIG. 5 determines whether the use of the "protected" telephone line is valid (step 507) using ICV 70. This step integrates the individual speaker-identification decisions from the second stage, takes into account a set of pre-defined threshold values, and produces a binary decision as to whether the monitored conversation on the protected telephone line is authorized. An algorithm that could be used in this stage is one that checks if MAX(Pi), where i=1 to N (N=the number of speakers in the conversation), exceeds some threshold value. It is possible to design more effective algorithms in this stage, including those that may feed output back into the second and/or first stages for overall procedure improvement.

The fourth and final stage generates telephone line control commands to the telephone switch carrying the protected telephone line (step 508). In FIG. 1, the system control unit 10 executes the application that issues appropriate line control commands. FIG. 6 includes a list of telephone line control command primitives that may be supported by the VITES system in the OPERATOR state. Other switch commands may be used in order to accommodate a variety of PBX and other telephone switch command languages, the appropriate command scripts being downloaded to system memory 20.

As shown in FIG. 6, if the call is determined to be valid, then no line control action is taken. If the call is determined to be an invalid call, then any one of a number of line control procedures can be followed. For example, the call can simply be terminated. The line itself can also be disabled for some predetermined period of time.

Another option is to permit the call to continue, but record all or a portion of the conversation for later review. The recorded voice information can either be stored to one of the memory devices illustrated in FIG. 1 or the call can be routed to an output port that is preconfigured to record the call. The call parameters can also simply be logged without recording the actual conversation, but with an indication of possible toll-fraud activity. For example, the line identification, call duration and time, etc., may be recorded for later review.

Yet another option is to interfere or intrude on the call and either inject noise or play a warning message to the call participants. Such a noise or message can be generated by system control unit 10 using information stored in either system memory 20 or speaker database 40.

The system, if fitted with text-dependent speaker verification capabilities, can intrude on the call and ask for some identifying information from one of the call participants. If an authorized user is one of the participants, he or she can audibly enter a password or other identifier, or can enter a number using the touch tone keypad. Upon verification that one of the participants is authorized the call is then permitted to continue without further interruption.

Finally, if the call was placed using a particular access code (or password), as in a text-dependent system, the invention can prevent further use of that access code until the authorized user of that access code can be contacted to determine if the system integrity has been compromised. (This option is not listed in FIG. 6).

The present invention is preferably used to monitor a "live" telephone conversation, defined herein as any conversation where at least one speaker is speaking in real time. However, it is possible to monitor a conversation in a delayed mode where the conversation is stored and subject to later analysis for fraudulent use of the phone line.

Figure 7:
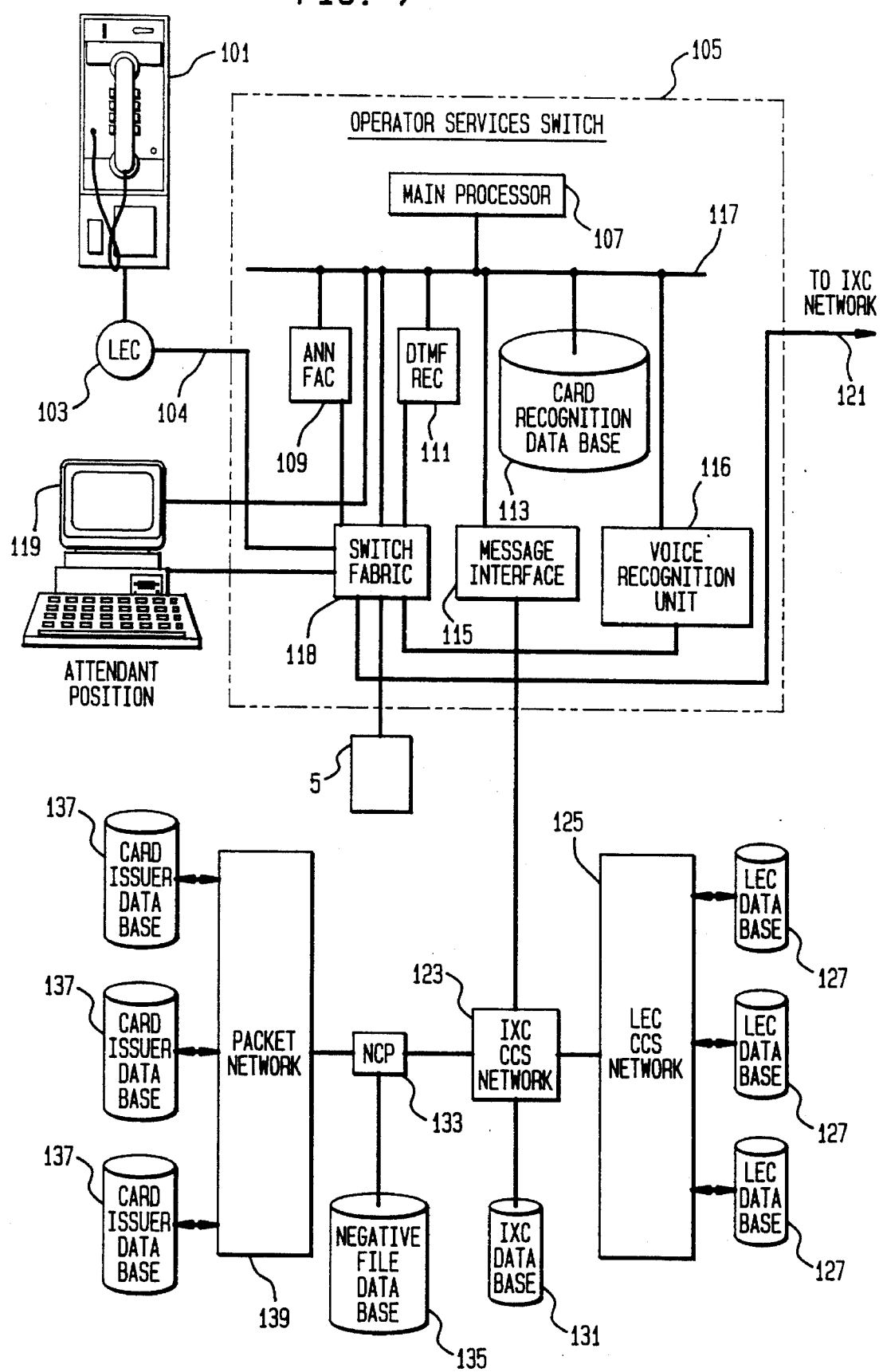
FIG. 7 is a block diagram of another alternative embodiment the system shown in FIG. 1.

The invention described above also finds utility in a calling card based system where additional fraud detection and prevention features are desired. Referring to FIG. 7, such a calling card system is shown connected to a standard telephone 101. A calling party originates a card call at telephone station 101 by a) dialing 0+area code+number or b) access code+0+area code+number. A switch of local exchange carrier (LEC) XO3 receives the dialed digits and, from the dialed 0, recognizes that the call is an operator services type of call that may be a card call. Therefore, local exchange carrier (LEC) 103 routes the call to operator services switch 105 for further handling.

If an access code for a specific interexchange carrier (IXC) is not specified as part of the digits dialed by the calling party but yet the call must be carried by an interexchange carrier, local exchange carrier 103 routes the call over a trunk, e.g., trunk 104, to operator services switch 105 of an interexchange carrier. Local exchange carrier 103 is aware of a default interexchange carrier to which telephone station 101 has been assigned. If the dialed digits include an access code specifying a particular interexchange carrier, local exchange carrier 103 routes the call over a trunk to an operator services switch 105 of the specified interexchange carrier. If the call is one which is not to be carried by an interexchange carrier, local exchange 103 routes the call to one of its own operator services switches.

Operator services switch 105 includes: a) main processor 107, b) announcement facility (ANN FAC) 109, c) dual tone multi-frequency receiver (DTMF REC) 111, d) card recognition data base 113, e) message interface 115, f) bus 117, g) switch fabric 118 and h) voice recognition unit Main processor 107 controls the overall operation of operator services switch 105 by performing any necessary processing and exchanging messages with the other components of operator services switch 105 over bus 117. ANN FAC 109 can make various announcements which can be heard by the calling party. The announcements, or combinative portions thereof, are prestored in ANN FAC 109 with pointers to the announcements. DTMF REC 111 receives dual tone multi-frequency signals that are transmitted in response to the pressing of keys on the keypad of a telephone station 101 and supplies the digit corresponding to each pressed key to main processor 107.

A VITES module 5, like module 5 shown in FIG. 1, is connected to switch fabric 115. A speaker identity capture system and speaker database (not shown in FIG. 7) can also be connected to module 5 in FIG. 7 in the same manner as shown in FIG. 1. Alternatively, one of the other databases shown in FIG. 7 can be used to store the speaker voice profiles.

Card recognition data base 113 contains at least the information necessary to determine from the digits supplied by a calling party the issuer of the card to which the call is to be charged. Message interface 115 is a protocol conversion unit that permits operator services switch 105 to communicate with a common channel signaling (CCS) network, such as IXC CCS network 123. It is responsible for formatting all messages transmitted to IXC CCS network 123 and for extracting responses received from IXC CCS network 123. In particular, card validation query messages are transmitted to IXC CCS network 123 and card valid or invalid response messages are received therefrom.

At various times during a call, switch fabric 118 connects the trunk on which the calling party's call arrived at operator services switch 105, e.g., trunk 104, to ANN FAC 109 or DTMF REC 111. The purposes of such connections are described further below. Once the billing for a call has been attended to, switch fabric 118 connects the trunk on which the calling party's call arrived to the rest of the interexchange carrier's network, via link 121, to route the call to its ultimate destination.

Attendant position 119, staffed by a human attendant, also interfaces with operator services switch 105 via both bus 117 and switch fabric 118. The interface via bus 117 permits the attendant to exchange information with main processor 107. The interface via switch fabric 118 allows the attendant to converse with the calling party.

IXC CCS network 123 can route queries for card number validation a) to LEC CCS network 125 and ultimately to one of the LEC data bases 127, b) to IXC data base 131 or c) to network control point (NCP) 133 and ultimately to either negative file data base 135 or one of card issuer data bases 137, via packet network 139. NCP 133 is a unit of known type that interfaces with packet network 139 and negative file data base 135 so as to present the information contained therein to IXC CCS network 123 as if it originated from a single database.

Negative file data base 135 contains a list of so-called "hot cards". Hot cards are cards that are known to be invalid, e.g., cards that were reported stolen. Using such a data base speeds the processing of each call attempted using a hot card in that it avoids a full search of the data base of the card issuer. The list of hot cards is supplied periodically by the commercial card issuers. All the other data bases contain listings of valid card numbers against which the card number supplied by the calling party is compared. If the card number is not found in the hot card list of negative file data base 135, a card validity query is sent via packet network 139 to the card issuer data base 137 maintained by the particular card issuer.

Calling cards issued by telephone companies typically have telephone-line-number-based numbers, which comprise 1) a subscriber's telephone number plus 2) a four digit personal identification number, or PIN. These cards can be distinguished from commercial credit cards on the basis of the length of their card numbers. Other cards having numbers of the same length as telephone-company-issued-line-number-based cards are distinguished therefrom by properties which make the numbers of the other cards invalid as telephone numbers, such as having a zero as the fourth digit. Should some of the card numbers of two or more card issuers overlap, with no distinguishable features between them, it may be necessary to prompt the calling party for an indication of the issuer of the card that the calling party is using. Such prompting, as well as the receiving of the indication, would be performed by ANN FAC 109 and DTMF REC 111 working under the control of main processor 107.

When a caller at telephone station 101 initiates a 0+ type of telephone call, the call information, including the dialed digits, is routed by LEC 103 to operator services switch 105. Operator services switch 105 then prompts the calling party to supply his card number. To do so, switch fabric 118 connects ANN FAC 109 to trunk 104 on which the calling party's call was received.

The calling party may supply the card number by pressing keys on the keypad of telephone station 101, thereby generating dual tone multi-frequency signals representing the card number. If signals are so generated, DTMF REC 111 receives and translates them. To this end, switch fabric 118 connects the trunk at which the calling party's call is terminated to DTMF REC 111. The resulting translated digits are supplied to main processor 107, via bus 117.

The system then tests to determine if main processor 107 received the digits of a card number within a predetermined length of time. If the result of this test is no, an attendant, at attendant position 119, converses with the calling party and has him verbally supply the card number if the call is a card call. The attendant then enters the card number supplied by the calling party into attendant position 119 which, thereafter, transmits it to operator services switch 105.

A validation query is initiated by operator services switch 105 and a response is awaited. The query is transmitted via message interface 115 to IXC CCS network 123, which routes the query appropriately. If the result of the inquiry is that the card is valid, the system determines if the call was handled by an attendant at attendant position 119 or was automatically handled.

If the call was automatically handled, an announcement is presented to the caller thanking him or her for charging the call. ANN FAC 109 generates the announcement for presentation to the calling party. Switch fabric 118 couples ANN FAC 109 to trunk 104 at which the calling party's call is terminated so that the calling party can hear the announcement.

If the call was handled by an attendant, then the attendant makes an appropriate announcement to the calling party.

If the card was determined to be invalid, the caller is notified, by way of an announcement from ANN FAC 109, that the card number supplied is invalid. Alternatively, if the call is handled by an attendant, the attendant will inform the calling party that the card number supplied is invalid. Regardless of how the announcement is presented, the caller could be transferred, automatically or in response to prompting, to a customer service representative of the card issuer, if his card is denied.

In other embodiments, ANN FAC 109 can supply announcements that can eventually be perceived by the calling party but are in forms other than voice. For example, ANN FAC 109 might supply messages that can be displayed on a display incorporated into telephone station 101. In another embodiment, DTMF REC 111 might be replaced with a message receiver that can receive signals other than dual tone multi-frequency signals. These signals would be supplied from telephone station 101 to deliver the card number to operator services switch 105. For example, a magnetic card stripe reader could be incorporated into telephone station 101 and supply ISDN-formatted messages containing the card number to operator services switch 105. Alternatively, voice recognition unit 116, which recognizes the digits of the card as spoken by the caller, might be invoked for use in a particular call instead of DTMF REC 111. Those skilled in the art will also recognize that, for such embodiments, strings other than strings of digits may be used to identify an account associated with a card.

The operation of VITES module 5 in the system of FIG. 7 is the same as described above in connection with FIGS. 1–6. The call is placed and charged using standard calling card techniques, as described above. Once the call is connected and a conversation begins, VITES module 5 is bridged by switch fabric 118 to the call and can be used to verify that one of the voices on the line is an authorized user of the card used to charge the call. As in the previous embodiments, this user authorization determination is preferably made transparently to the user.

One advantage of the calling card based system is that it is not necessary to compare the voice signals segmented on the line to each of the voice profiles stored in memory. Instead, the calling card number can be used to quickly locate those voice profiles that correspond to the authorized users of that particular card (usually only one or two people). These profiles are then compared to the voice information taken from the line and a determination is made as to whether one of the speakers is authorized. Line control actions may then be taken, as explained above.

As an alternative to storing the voice profile of the authorized user for a particular card in a memory device in the system, this information can be encoded on the card itself by any appropriate storage technique, e.g., a magnetic strip on the card. The user will then pass his card through a data reading device on or near the phone being used and the voice profile is entered into the system for eventual comparison with the voice information obtained from the telephone line.

The above description is merely illustrative of the present invention and it will be readily apparent to those having skill in this art that modifications may be made and that other systems for implementing the concepts disclosed herein are within the scope of the appended claims.

We claim:

1. An apparatus for determining whether at least one of a plurality of users of a telephone line is an authorized user of said telephone line, said apparatus comprising:
   a memory for storing an authorized voice pattern for each of a plurality of authorized users of the telephone line;
   a voice segregator for receiving voice information obtained from the telephone line, said voice information corresponding to voice patterns of a plurality of users of the telephone line, said voice segregator segregating said received voice information into a plurality of segregated voice patterns, each said segregated voice pattern corresponding to one of said plurality of users of the telephone line; and
   a comparator for receiving said segregated voice patterns from said voice segregator and comparing each said segregated voice pattern to said authorized voice patterns stored in said memory to determine whether one of said plurality of users of the telephone line is an authorized user.

2. The apparatus of claim 1 wherein said memory, said voice segregator and said comparator are connected to a plurality of telephone lines for determining whether calls made on each of the plurality of telephone lines includes a voice of at least one authorized user.

3. The apparatus of claim 1 wherein said voice information received by said voice segregator is a live conversation.

4. The apparatus of claim 1 further comprising line interrupt means for interrupting the telephone line if said comparator determines that none of said plurality of users of the telephone line is an authorized user.

5. The apparatus of claim 1 further comprising recording means for recording said voice information received from the telephone line if said comparator determines that none of said plurality of users of the telephone line is an authorized user.

6. The apparatus of claim 1 further comprising a warning message generator for playing a warning message on the telephone line if said comparator determines that none of said plurality of users of the telephone line is an authorized user.

7. The apparatus of claim 1 further comprising a noise generator for generating noise on the telephone line if said comparator determines that none of said plurality of users of the telephone line is an authorized user.

8. The apparatus of claim 1 further comprising a telephone line disabling device for disabling the telephone line if said comparator determines that none of said plurality of users of the telephone line is an authorized user.

9. The apparatus of claim 8 wherein said disabling device disables the telephone line for a predetermined period of time.

10. The apparatus of claim 1 wherein the telephone line is one line in a private branch exchange.

11. The apparatus of claim 1 wherein said comparator compares said segregated voice patterns to each said authorized voice pattern stored in said memory, and identifies one of the said authorized voice patterns and one of the said segregated voice patterns that results in the closest match.

12. The apparatus of claim 11 wherein said comparator determines a quantitative difference between the said segregated voice pattern and the said authorized voice pattern that results in the closest match, and compares said quantitative difference to a threshold to determine whether the telephone line is being used by an authorized user.

13. The apparatus of claim 1 wherein said memory stores a voice pattern corresponding to at least one authorized user of a calling card used to access said telephone line.

14. The apparatus of claim 1 wherein said apparatus operates transparently to said plurality of users.

15. An apparatus for determining whether a telephone line is being used by at least one of a plurality of authorized users of the telephone line, said apparatus comprising:
   a memory for storing voice patterns for each of said plurality of authorized users of the telephoning line;
   means for segregating a live conversation on the telephone line to obtain at least one voice pattern corresponding to one of a plurality of persons engaged in said live conversation; and
   a comparator tbr receiving said segregated voice pattern and comparing said segregated voice pattern to said stored voice patterns.

16. The apparatus of claim 15 wherein said means for segregating comprises a voice segregator for receiving said live conversation from the telephone line and segregating said live conversation into a plurality of voice patterns, each said segregated voice pattern corresponding to one of said persons engaged in said live conversation.

17. The apparatus of claim 15 wherein said comparator receives a plurality of voice patterns from said segregating means and identifies one of said plurality of segregated voice patterns that most closely matches any of said stored voice patterns.

18. The apparatus of claim 15 further comprising line interrupt means for interrupting said five conversation if said comparator determines that none of said plurality of persons engaged in said five conversation is an authorized user of the telephone fine.

19. The apparatus of claim 16 further comprising recording means for recording said five conversation if said comparator determines that none of said plurality persons engaged in said live conversation is an authorized user of the telephone line.

20. The apparatus of claim 16 wherein said apparatus operates transparently to said persons engaged in said live conversation.

21. A method for determining whether a telephone line is being used by an authorized user, said method comprising the steps of:
   segregating voice information received from the telephone line into a plurality of voice patterns, each said segregated voice pattern corresponding to a single user of the telephone line;
   comparing each said segregated voice pattern to at least one stored authorized user voice pattern to obtain a result, each authorized user voice pattern corresponding to a user authorized to use said telephone line; and determining whether the telephone line is being used by an authorized user of said telephone line based on said result.

22. The method of claim 21 wherein said method is carried out transparently to a user of said telephone line.

23. The method of claim 21 wherein said step of comparing comprises comparing said segregated voice patterns to a plurality of stored authorized user voice patterns and identifying one of said segregated voice patterns and one of said stored authorized user voice patterns that most closely match.

24. The method of claim 21 further comprising the step of:
interrupting a live conversation on the telephone line if said determining step indicates that the telephone line is not being used by an authorized user.

25. The method of claim 21 further comprising the step of:
recording a live conversation on the telephone line if said determining step indicates that the telephone line is not being used by an authorized user.

* * * * *